Dec. 26, 1950     A. D. BRUNDAGE     2,535,894
VISOR MOUNTING DEVICE
Filed Aug. 30, 1949

INVENTOR.
Alan D. Brundage.
BY
Maxwell K. Murphy
ATTORNEY.

Patented Dec. 26, 1950

2,535,894

UNITED STATES PATENT OFFICE 2,535,894

VISOR MOUNTING DEVICE

Alan D. Brundage, Detroit, Mich., assignor to F. L. Jacobs Co., Detroit, Mich., a corporation of Michigan Application August 30, 1949, Serial No. 113,210

2 Claims. (Cl. 287—93)

The present invention relates to a mounting device for sun visors or glare shields which are commonly mounted on the interior of motor vehicle bodies in the driver's compartment thereof, and is an improvement over the visor mounting device shown in the co-pending application of Clare S. Jacobs, Serial No. 73,458, filed January 29, 1949.

The primary object of my invention is to provide an improved mounting device for supporting a glare shield or visor in an automobile body, whereby adjustment of the visor to various desired positions adjacent the windshield or side window of the body may be easily and readily accomplished.

Another object of my invention is to provide an economical construction which may be cheaply manufactured and easily assembled to the automobile body.

A further object of my invention is to provide a visor embodying a bracket having an integral conically tapered bearing portion adapted to receive the conically tapered bent portion of the visor arm and means for holding the arm in the tapered head portion of the bracket whereby the free end of the arm upon which the shield portion of the visor is mounted may be swung in a substantially horizontal arc.

More particularly, the mounting device comprises a bracket of stamped or die cast construction, having an apertured member secured therein, said member being provided with a conically tapered aperture. A shield supporting arm having a substantially right angle bent portion provided with a conical taper is adapted to be received in the said aperture. The bent portion of the arm is pivotally supported in the tapered bearing head portion of the bracket thus provided and held therein by a leaf spring of simple design. The leaf spring tends to draw the tapered portion of the arm into the tapered bearing head of the bracket and thus induces friction, which holds the swinging portion of the arm in various positions of adjustment. The shield portion of the visor is pivotally mounted on the swinging portion of the arm in the conventional manner whereby movement is permitted such that the operator may adjust the shield to higher or lower positions incident to its movement in its horizontal arc, but sufficient friction is provided in connection with both the pivotal movement of the shield on the arm and the swinging of the visor in the bracket such that accidental or inadvertent movement of the visor to positions where it might totally obstruct vision of the vehicle operator is prevented.

In the aforementioned application of Clare S. Jacobs, the bracket is of unitary construction and the leaf spring is engaged at one end with a shoulder formed in the bracket. This construction works well with visors of light weight, but because the thrust of the spring is not exactly along the axis of the bent portion of the supporting arm, heavy visors tend to swing in the conical pivot when the vehicle is in motion. In my improved construction, the visor bracket is made in two parts, the part embodying the conical aperture being welded or otherwise attached to the base portion. The leaf spring is provided with an aperture in one end through which the bent portion of the support arm extends. The spring is thus held against displacement and the direction of thrust of the spring is coincident with the axis of the arm bent portion.

Other objects and advantages of the invention will be apparent from the following disclosure, reference being had to the accompanying drawings in which.

Like characters of reference are employed throughout the following description to designate parts shown in the drawing corresponding thereto.

Figure 1:
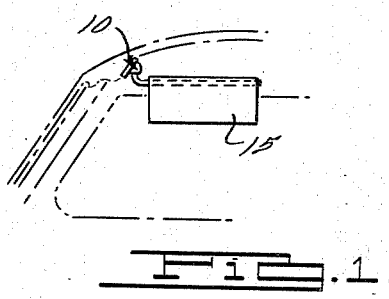
Fig. 1 illustrates the complete visor assembly as it appears when mounted in an automobile body.
Figure 2:
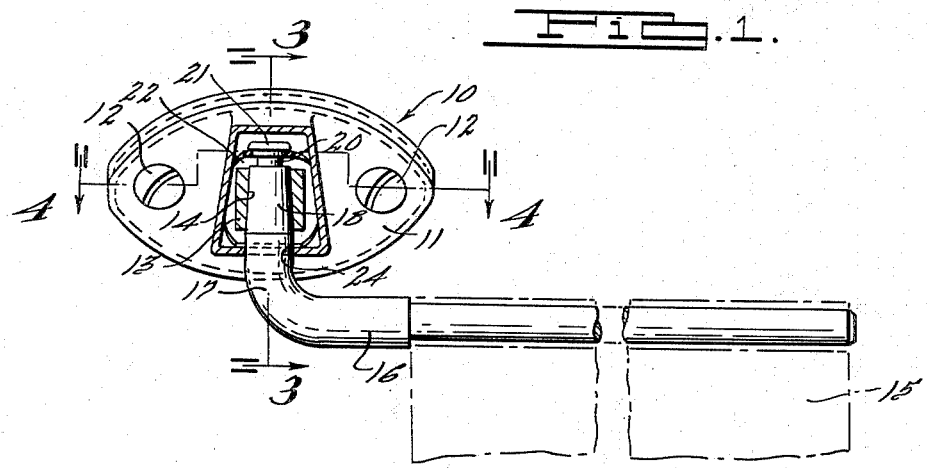
Fig. 2 is a vertical section through the mounting device.
Figure 3:
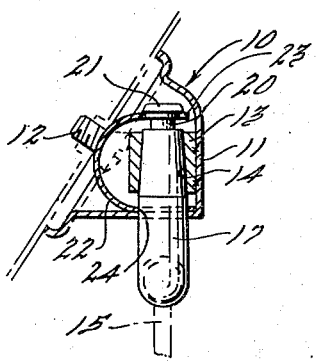
Fig. 3 is a vertical section taken along the line 3—3 of Fig. 2 as viewed in the direction indicated by the arrows.
Figure 4:
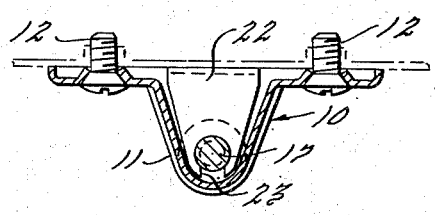
Fig. 4 is a section taken along the line 4—4 of Fig. 3.
Figure 5:
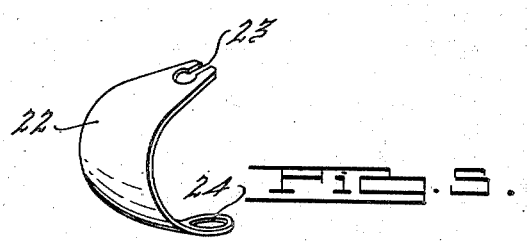
Fig. 5 is a detail view of the leaf spring.

My improved visor mounting device comprises a bracket 10, having a base wall 11, provided with countersunk holes for fastening devices, such as the screws 12. The latter are adapted to secure the bracket 10 to the header portion of an automobile body, as illustrated in Figs. 1 and 3.

The bracket 10 may be of stamped or die cast construction and has an arm carrying portion 13 separately formed and united therewith by welding or other suitable means rearwardly of the plane of the base wall 11. The portion 13 is formed with a solid section having a tapered aperture 14. The aperture is disposed at an angle to the base such that when the bracket is mounted on the slanting header portion of a body, the axis of the aperture is substantially vertical.

The shield portion 15 of the visor is carried by an arm 16 having a portion 17 bent at substantially right angles to the main portion thereof. The shield 15 is pivotally mounted on the main portion of the arm for swinging about the axis of the arm in the manner well known in the art. The bent portion of the arm 17 is conically tapered, as indicated at 18, and is adapted to be received in the aperture 14, the end of the arm protruding beyond the aperture into one of the recessed portions of the bracket.

Beyond the taper the arm is provided with a circumferential groove 20 adjacent a rounded-off head portion 21. As can be readily seen from the drawing, a U-shaped member 22 of spring steel having a bifurcated end portion providing a recess 23 engages the circumferential groove 20 beneath the head 21. The other end of the leaf spring 22 is provided with an aperture 24. Upon assembly of the parts, the bent portion 17 of the arm is inserted through the opening 24 in such manner that the spring is held against displacement and the force of the spring tends to urge the bent portion of the arm axially of the tapered aperture 14.

It may thus be seen that the arm 16 will be retained in the bracket by the leaf spring 22 and the tapered portion thereof is constantly urged in a direction exactly axial of the tapered aperture such that sufficient friction is induced to permit the arm to be easily swung about the axis of the aperture while preventing accidental or inadvertent movement thereof.

It will be readily apparent to one skilled in the art that I have provided an exceptionally simple and economically manufactured visor supporting device.

The device consists essentially of only two parts in addition to the arm and shield assembly, i. e., the fabricated bracket 10 and the leaf spring 22. The device may be preassembled for easy mounting on the automobile body simply by inserting the tapered portion of the arm into the opening 24 of the spring and into the tapered aperture of the bracket and snapping the leaf spring 22 in place through the relatively large opening provided in the base wall 11.

Although a specific embodiment of my invention has been shown for illustrative purposes, it will be understood that various changes may be made within the scope of the appended claims without departing from the intent or spirit of the invention.

I claim:

1. A mounting device for glare shields comprising a bracket having a base wall adapted for attachment to an automobile body header portion, a tapered aperture in said bracket disposed rearwardly of said base wall, a bent arm carried by said bracket for swinging movement about the axis of said aperture, said arm having a tapered portion adapted to be received in said aperture, a circumferential groove in said arm, and a U-shaped leaf spring having an opening in one end thereof for receiving the tapered portion of said arm and a bifurcated portion at the other end thereof adapted to engage said groove for urging said arm axially of said aperture.

2. A mounting device for glare shields comprising a bracket having a base wall and an arm carrying portion, recessed portions below and above said latter portion, a tapered aperture in said arm carrying portion, an arm having a bent portion provided with a tapered end disposed in and extending beyond said aperture, a circumferential groove in the end portion of said arm extending beyond said aperture and a U-shaped leaf spring disposed in engagement with said bent portion below and above said arm carrying portion for urging said arm portion axially of said aperture and for retaining said arm and spring in assembled relation.

ALAN D. BRUNDAGE.

REFERENCES CITED

The following references are of record in the file of this patent:

UNITED STATES PATENTS

| Number | Name | Date |
|---|---|---|
| 2,112,464 | Jacobs | Mar. 29, 1938 |